Sept. 22, 1970
T. MOORE
3,530,337
ELECTRICAL MOTOR OVERLOAD INDICATOR AND
VOLTAGE CUTOUT DEVICE
Filed Nov. 6, 1968
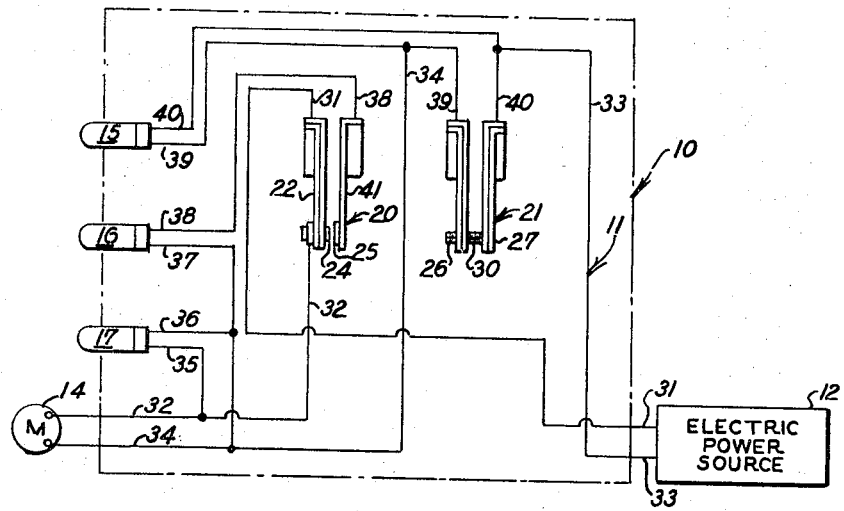
FIG. 1
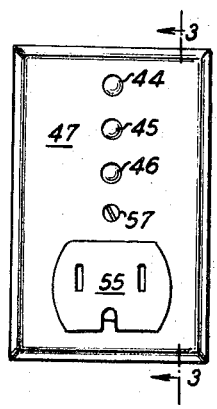
FIG. 2
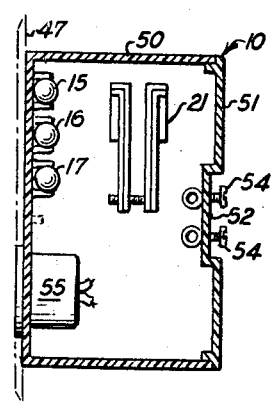
FIG. 3
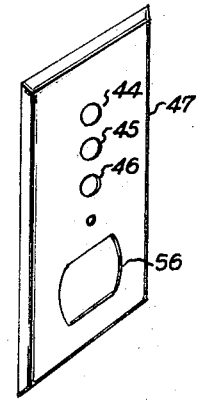
FIG. 4
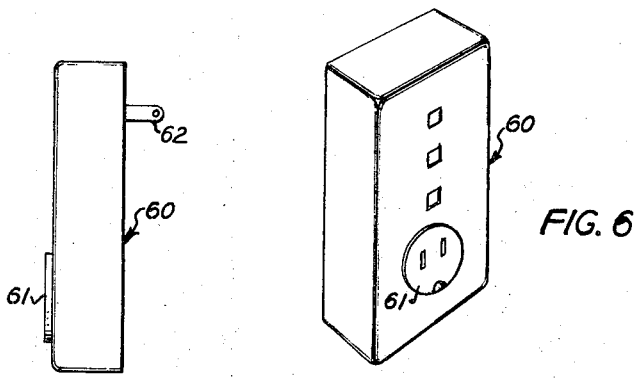
FIG. 5
FIG. 6
INVENTOR
THOMAS MOORE
BY
Mason, Mason & Albright
ATTORNEYS

United States Patent Office 3,530,337
Patented Sept. 22, 1970

3,530,337
ELECTRICAL MOTOR OVERLOAD INDICATOR AND VOLTAGE CUTOUT DEVICE
Thomas Moore, 7235 Leavitt Road,
Elyria, Ohio 44035
Filed Nov. 6, 1968, Ser. No. 773,923
Int. Cl. H02h 3/08, 7/08
U.S. Cl. 317—13                              10 Claims

ABSTRACT OF THE DISCLOSURE

An electrical outlet receptacle for receiving the cords of an electric motor, the receptacle containing lights (1) to indicate that the motor is operating normally, (2) to warn of overload conditions and (3) to indicate that the motor has been cut out because of continuous overload conditions. A pair of bimetallic thermal switches mounted in the receptacle are in series with each side of the motor. One of such switches is normally opened with the current to the motor passing through a single bimetallic portion of the switch only. When the current is sufficient to heat and therefore bend such bimetallic element, it closes and completes the circuit to an overload warning lamp. The other bimetallic thermal switch, normally closed, is adjusted to open when heated by the quantity of current passing therethrough which is indicative of a serious overload condition in the motor. An indicator lamp is connected across such switch so that when the switch opens, the indicator lamp, which has a comparatively high resistance, is placed in series with the motor and due to the comparatively low resistance of the motor the voltage on the motor is reduced drastically to be practically nil and the other lamps also lose the voltage applied thereto. A further indicator lamp is placed across the electrical lines leading to the motor to show the availability of normal voltage to the motor. The receptacle may be either adapted to be received within an ordinary wall socket or as an adaptor for a household outlet.

BACKGROUND OF THE INVENTION

The invention is in the field of power overload indicators for electric motors and of apparatus for removing dangerous voltage from motors responsive to serious overload conditions therein.

The ordinary household motor in this country usually has a power rating of about one-third horsepower and is designed to operate on 110 to 115 volts of household current. Such motors are commonly used to operate wasing machines, dryers, garbage disposal units and the like. Although replacement of such a motor is not inexpensive, generally the only protective devices for such motors in the ordinary household are fuses. In some instances, however, circiut breakers will be incorporated on the motor where the load is highly variable such as with garbage disposal units.

The most common cause of failure with household motors as well as industrial electrical motors is a failure of the brushes, the bearings, or with the starter switch of the motor. These conditions frequently do not appear suddenly and are not known until the motor has burned out by reason of having operated for relatively long periods of time in an overload condition. The inconvenience which follows from the failure of an electrical motor on household appliances may not be limited to the expense of repair and replacement alone. If the heating system is involved, the health of the occupants of the household may be seriously affected.

A long-felt need exists for an electric motor protector which is inexpensive to manufacture and which would both provide an early warning of conditions which may eventually cause failure of the motor and which will remove overload conditions before irreparable damage to the motor results therefrom. I have solved the above-indicated problem previously existant in the prior art with the unique utilization of a pair of quick-acting electrical thermocouples in combination with lamps for indicating the contemporary condition of the motor. One of the thermocouples, which is normally opened, has its bimetallic section in series with one side of the motor. The bimetallic section is so selected that when the motor begins to have an overload condition evidenced by drawing excessive current, the section heats up and bends to close a circuit to the warning indicator. The other thermocouple switch is normally closed and has a bimetalic element which opens in response to serious overloading of the motor evidenced by a current higher than that required to close the first switch and light the warning lamp. A lamp is disposed across the second switch which is caused to light only when the switch opens and because of its high resisance relative to the resistance of the motor, the voltage across the motor is reduced a very small and harmless amount. Both of the switches, upon cooling, return to their normal closed or open condition. However, it has been found that with the second switch, if the conditions which caused the switch to open in the first place still prevail, current is supplied to the motor for only a short and harmless duration of time until it again opens and remains in such condition until again sufficiently cool to close.

The components of the device are inexpensive and long-lasting. They can be mounted and fitted within a receptacle which replaces an ordinary household electrical outlet or in an adapter designed to fit over such ordinary household electrical outlet, or, if desired, the device can be built into an appliance.

BRIEF DESCRIPTION OF THE DRAWINGS

Other objects, adaptabilities and capabilities will appear as the description progresses, reference being had to the accompanying drawings, in which:

FIG. 1 is an electrical diagram of the device;

FIG. 2 shows the front of a receptacle designed for ordinary household use;

FIG. 3 is a sectional view taken on lines 3—3 of FIG. 2 with the plate member shown in dot-dash lines;

FIG. 4 is a perspective view of the front plate of the device shown in FIGS. 2 and 3;

FIG. 5 is a side elevational view of the device modified to be an adapter for an ordinary household outlet; and FIG. 6 is a perspective view of the adapter shown in FIG. 5.

DESCRIPTION OF THE PREFERRED EMBODIMENTS

Referring to FIG. 1, the receptacle which is depicited diagrammatically by the dot-dash lines is designated by reference numeral 10. Within the receptacle is a circuit means 11 which comprises conductive members such as insulated copper wires well known to the art. The circuit means 11 is connectable on one side to an electrical power source 12 such as, for example, ordinary 110 AC house current, and on the other side it is connectable to a motor 14 which may be, for example, a conventional one-third horsepower AC induction motor. Mounted within the receptacle 10 are three electrical indicia means comprised of a red lamp 15, a yellow lamp 16, and a green lamp 17. Also mounted within the receptacle 10 are a pair of quick acting electrical heat switches 20 and 21. Switch 20 includes the bimetallic member 22 which, when heated by the passage of electrical current therethrough, biases to bring contact points 24 and 25 together. In switch 21 there are a pair of bimetallic members 26 and 27 which are normally in electrical contact through a metallic stud 30 threaded through a metallic member 26, but which are biased apart by the passage of sufficient current therethrough whereby the stud 30 no longer contacts the bimetallic member 27.

The circuit means 11 comprises a first conductive member 31 which leads from the connection to the electrical power source 12 to make electrical contact with the bimetallic member 24. A second conductive member 32 connects electrically to opposite end of the bimetallic member 24 and leads therefrom to the connection to the motor 14. A third conductive member 33 leads from the connection to the electrical power source 12 to make electrical contact with the bimetallic member 27. A fourth conductive member 34 conductively connects to the bimetallic member 26 and leads to a connection to the motor 14.

A further circuit for the green lamp 17 comprises a fifth conductive member 35 which leads from the second conductive member 32 to lamp 17 and a sixth conductive member 36 which leads from the opposite electrical side of lamp 17 to complete the circuit with the fourth conductive member 34.

A still further circuit for the yellow lamp 16 comprises a seventh conductive member 37 which leads from the fourth conductive member 34 (via the sixth conductive member 36) to lamp 16 and an eighth conductive member 38 which leads from the opposite electrical side of lamp 16 to a portion 41 of switch 20 which is conductive to contact 25.

The red lamp 15 connects on one side to the fourth conductive member 34 through a ninth conductive member 39 and on its other side connects to the third conductive member 33 through a tenth conductive member 40.

Under normal operating conditions with motor 14 operating within its power rating, only the green lamp 18 is lit. However, if the current is increased sufficiently beyond that rated for motor 14 to raise the temperature of the bimetallic member 22 sufficiently, contact is made between contact points 24 and 25 which places voltage across the lamp 16 to show this condition to exist. It will be understood that this does not disconnect the motor 14 and both lamps 17 and 16 are lighted to indicate the overload condition. Although the bimetallic member 22 can heat up somewhat rapidly so as to bring contact points 24 and 25 into contact, the cooling off process is considerably slower and thus even for a period of time after an overload is no longer applied to the motor 14, the lamp 16 remains in a lighted condition as an indication that the motor 14 has undergone an overload condition.

If the overload condition in motor 14 is more sustained, the switch 21 is heated sufficiently so that the bimetallic elements 26 and 27 move apart whereby stud 30 is no longer in contact with the bimetallic member 27. When this occurs, the red lamp 15 is placed in series with the motor 14 and, because it has a much higher resistance than the motor 14, almost all of the available voltage is disposed across the lamp 15 and practically none across the motor 14, or therefore also across the second and fourth conductive members 32 and 34. In consequence, the yellow lamp 16 and the green lamp 17 are, for all practical purposes, turned off. In this condition, the motor 14 is effectively protected from harmful voltage; however, after a period of time the switch 21 cools sufficiently so that voltage is restored to the motor 14, the red lamp 15 is turned off and the yellow and green lamp 16 and 17 are again lighted. Assuming that the condition of the motor remains unchanged, in a very short period—at most a very few seconds and usually a split second—switch 21 is again opened, red lamp 15 turns on and yellow and green lamps 16 and 17 blink off. The greater the overload condition, the shorter the interval. The motor 14 is protected since overheating occurs in the switch 21 and causes it to open before harmful overheating can occur in the motor 14. However, the blinking of the lamps, with the intermittent noise of the motor which thus occurs is much more likely to attract attention than would be the case if the circuit were broken and the switch 21 retained in an open position until reset by hand. If desired, insulation can be applied to the switch 21 to delay its time for closing due to cooling.

The lamps 15, 16 and 17 are preferably low-power lamps of sturdy construction such as used for example for circuit testers. The receptacle 10 is normally of Bakelite or other insulating plastic which may be shaped with protrusions as shown in FIG. 3 to clamp the lamps 15, 16 and 17 in position over apertures 44, 45 and 46 which extend through a cover plate 47. The circuit means 11 and other wiring is carried in a parallelepiped member 50 which together with back plate 51 clamped thereon comprise the receptacle 10. The back plate 51 has a depression 52 with screw conducting leads 54 adapted to receive conductive means from an electrical power source 12. An outlet member 55 is snugly received by the member 50 and extends through an opening 56 in the cover plate 47. The cover plate 47 is secured to the member 50 by a screw 57 or other appropriate securing means. The switch 21 is mounted on one side of the member 50 and the switch 20 (not shown in FIG. 3) is mounted on the other side. It will, however, be understood that these components are well known to the art and a number of equivalent structures will readily occur to electrical engineers and others knowledgeable in the electrical field.

Where a particular outlet will be used only for a certain known electrical appliance such as, say, a washer or dryer, then either on initial installation or subsequently, an assembly such as shown in FIGS. 2, 3 and 4 may be installed. In the event that difficulties should occur in a motor so connected, a warning will first appear by the lighting of lamp 16 behind the aperture 45 and, although the motor may still be operable, it should normally be checked for malfunction in the near future. Should a more serious condition occur whereby the motor is cut out by the opening of switch 21, the lamp 15 glows through the aperture 44 and the motor 14 is thus effectively cut off and protected from serious damage until its malfunction can be corrected. Upon seeing the light glow through aperture 44, or having his attention drawn thereto by occasional blinking of lamps 16 and 17 through apertures 45 and 46, the operator would normally withdraw the plug of the motor 14 from receptacle 55 and attend to the malfunction when possible.

FIGS. 5 and 6 shown a variation of the receptacle 10 wherein the receptacle is in effect an adapter 60 having an outlet 61 and, extending from the back, a pair of plug prongs 62 which are adapted to be received by a normal household outlet. The adapter 61 is otherwise electrically identical in function and circuit with that shown and described with reference to FIG. 1. The purpose, however, of the adapter 61 is to provide a convenient protector of the type described which can be used in conjunction with any ordinary household electrical outlet and serve for the user the same purpose as a more permanent installation of the type shown in FIGS. 2, 3 and 4.

If the malfunction which causes switch 21 to be opened and thus remove harmful voltage from motor 14 is something obvious, say an impediment to the movement of the agitation member in a washer or a tumbler in a dryer, upon removal of the impediment, the motor 14 when again plugged into an outlet member 55 or 61 will operate in its normal fashion with a green lamp, and permanent damage to the motor 14 has been prevented. If the problem lies in the bearings of the motor 14, the cost of replacing same is much less than the replacement of the entire motor 14. Thus with the device as disclosed herein, the major causes of motor failure are prevented and irreparable motor failure should be largely obviated.

Having thus described my invention, what I claim as new and desire to secure by Letters Patent of the United States is:

1. A device for indicating electrical motor overload conditions and for effecting discontinuance of voltage applied to said electrical motor on an increase of said overload conditions, which comprises:

a receptacle (10), first (20) and second (21) quick-acting electrical heat switches mounted in said receptacle, first (17), second (16) and third (15) indicia means mounted in said receptacle, circuit means (11) received in said receptacle including means for connecting an electrical motor of known power rating with an electrical power source of predetermined voltage, said first indicia means (17) connected to said circuit means to indicate that said voltage is applied thereto, said second indicia means (16) connected to said circuit means in series with said first switch (20) whereby when said first switch closes in response to a first predetermined overload condition in said circuit means, said second indicia means is actuated, said second switch (21) being adapted to be opened by a second predetermined overload condition in said circuit means greater than said first overload condition, said circuit means being in series through said second switch and said third indicia means (15) being in a further circuit across said second switch whereby when said second switch is opened in response to said second overload condition, said circuit means is in series with said third indicia means through said further circuit, the electrical resistance of said third indicia means being very high compared to that of said electrical motor of which the device is adapted for connection whereby when said second switch opens the total of said voltage is substantially across said third indicia means and harmful voltage is removed from across said motor.

2. A device in accordance with claim 1 wherein said switches each include a bimetallic member.

3. A device in accordance with claim 1 wherein said indicia means comprise electrical lamps.

4. A device for indicating an electrical motor overload condition which comprises:

a receptacle (10), a quick acting electrical heat switch (20) mounted in said receptacle, indicia means (16) mounted in said receptacle, circuit means (11) in said receptacle, said circuit means being connectable to an electric current (12) of predetermined voltage and also connectable in series through said switch with an electrical motor (14) having a predetermined power rating, said switch being normally opened and adapted to close when the current passing therethrough at said predetermined voltage exceeds the power rating of said motor, and further circuit means (37, 38) connected to said switch and said indicia means whereby when said switch is closed, electric current is applied to said indicia means through said further circuit means and is activated thereby.

5. A device in accordance with claim 4 wherein said switch includes a bimetallic member as an actuating member.

6. A device in accordance with claim 4 wherein said indicia means is a lamp.

7. A device for effecting and indicating the discontinuance of voltage applied to an electrical motor when said motor is overloaded which comprises:

a receptacle (10), a quick acting electrical heat switch (21) mounted in said receptacle, electrically actuated indicia means (15) mounted in said receptacle, said indicia means having a high electrical resistanec as compared to the electrical resistance of said motor, circuit means (11) in said receptacle, said circuit means being connectable to an electric current (12) of predetermined voltage and also connectable in series through said switch with an electrical motor having a predetermined power rating, said switch being normally closed and adapted to open when the current passing therethrough exceeds an amount relative to the power rating of said motor, and further circuit means (39, 40) which connect said indicia means across said switch whereby when said switch is opened said indicia means is actuated and said motor is placed in series through said first-mentioned circuit means and said further circuit means including said indicia means and harmful voltage is thereby removed from across said motor.

8. A device in accordance with claim 7 wherein said switch includes a bimetallic member as an actuating member.

9. A device in accordance with claim 7 wherein said indicia means is a lamp.

10. A device in accordance with claim 9 wherein said switch is opened by a bimetallic member included therein.

References Cited

UNITED STATES PATENTS

| | | | |
|---|---|---|---|
| 2,351,984 | 6/1944 | Leonard | 317—14.8 |
| 2,704,841 | 3/1955 | Van Ryan | 317—14 |
| 2,930,959 | 3/1960 | Slocum | 317—13.2 |
| 3,258,647 | 6/1966 | Clark | 317—40 |

J D MILLER, Primary Examiner

H. E. MOOSE, Assistant Examiner

U.S. Cl. X.R.

317—40; 318—471; 340—248, 252, 253